United States Patent [19]
Baity et al.

[11] Patent Number: 5,908,878
[45] Date of Patent: Jun. 1, 1999

[54] HIGH CONSISTENCY PLATINUM CURE ELASTOMER HAVING IMPROVED PHYSICAL PROPERTIES FOR FLUID HANDLING APPLICATIONS

[75] Inventors: Judith Diane Fairclough Baity, Jamestown, N.C.; Chana Wilson Evans, Saginaw; Alan La Verne Himstedt, Midland, both of Mich.

[73] Assignee: Dow Corning Corporation, Midland, Mich.

[21] Appl. No.: 08/934,654

[22] Filed: Sep. 22, 1997

[51] Int. Cl.$^6$ ..................................................... C08L 83/05
[52] U.S. Cl. .................... 523/203; 523/212; 523/213; 524/588; 528/15; 525/478; 525/479
[58] Field of Search ............................. 528/15; 524/588; 525/478, 479; 523/212, 213, 203

[56] References Cited

U.S. PATENT DOCUMENTS

| | | | |
|---|---|---|---|
| 2,803,619 | 8/1957 | Dickmann | 260/42 |
| 2,819,236 | 11/1958 | Dickmann | 260/29.1 |
| 3,419,593 | 12/1968 | Willing | 260/448.2 |
| 3,445,420 | 5/1969 | Kookosedes et al. | 260/37 |
| 3,652,475 | 3/1972 | Wada et al. | 260/29.1 |
| 3,671,480 | 6/1972 | Wada et al. | 260/29.1 SB |
| 3,690,804 | 9/1972 | Nave | 425/326 |
| 3,884,866 | 5/1975 | Jeram et al. | 260/32.8 SB |
| 3,989,667 | 11/1976 | Lee et al. | 260/46.5 |
| 4,057,596 | 11/1977 | Takamizawa et al. | 260/825 |
| 4,162,243 | 7/1979 | Lee et al. | 260/37 SB |
| 4,539,357 | 9/1985 | Bobear | 524/267 |
| 4,766,176 | 8/1988 | Lee et al. | 525/100 |
| 4,857,564 | 8/1989 | Maxson | 523/212 |
| 5,449,560 | 9/1995 | Antheunis et al. | 428/447 |

Primary Examiner—Robert Dawson
Assistant Examiner—Caixa Lu-Rutt
Attorney, Agent, or Firm—Richard I. Gearhart

[57] ABSTRACT

The present invention is a heat curable polyorganosiloxane composition comprising (A) a first polydiorganosiloxane having two diorganoalkenylsiloxy terminal groups per molecule and a total concentration of unsaturated hydrocarbon radicals of 0.118 to 0.156 mole percent; (B) a second polydiorganosiloxane having two diorganoalkenysiloxy terminal groups per molecule, and no detectable concentration of pendant unsaturated hydrocarbon radicals; (C) a third polydiorganosiloxane having two diorganoalkenysiloxy terminal groups per molecule and a total concentration of unsaturated hydrocarbon radicals of 1.37 to 2.24 mole percent; wherein the weight ratio of polydiorganoiloxanes (A), (B), and (C) satisfy the relationship (C)/(A+B)=0.0379 to 0.1071 and A/B=1.460 to 2.115; (D) a crosslinker containing silicone-hydrogen bonds, wherein the ratio of silicone-hydrogen bonds to the total ethylenically unsaturated hydrocarbon radicals present on the polydiorganosilanes (A), (B), and (C) is from 1.00 to 2.25; (E) from 5 to 50 weight percent of a silica filler; and (F) a catalytically effective amount of a platinum catalyst. Optionally, the composition may include an inhibitor.

32 Claims, No Drawings

HIGH CONSISTENCY PLATINUM CURE ELASTOMER HAVING IMPROVED PHYSICAL PROPERTIES FOR FLUID HANDLING APPLICATIONS

FIELD OF THE INVENTION

This invention relates to extrudable and moldable organosiloxane compositions. More particularly, this invention relates to extrudable organosiloxane compositions that can be cured by a platinum-catalyzed hydrosilation reaction to form elastomers exhibiting superior physical properties, particularly superior dimensional stability and resiliency.

DESCRIPTION OF THE PRIOR ART

Curable organosiloxane compositions containing at least one polydiorganosiloxane with at least two silicon-bonded vinyl radicals, an organohydrogensiloxane or organic peroxide curing agent and a silica filler are well known in the art pertaining to silicone elastomers. It is also known to improve the physical properties, particularly tensile and tear strengths of cured elastomers prepared from these curable compositions by using two vinyl-containing polydiorganosiloxanes of different molecular weights or a single vinyl-containing polydiorganosiloxane having a bimodal molecular weight distribution.

U.S. Pat. No. 3,671,480 which issued on Jun. 20, 1972 to Wada and Ito describes compositions cured by a hydrosilation reaction to yield elastomers exhibiting high values of tear strength. These compositions contain two different vinyl-substituted polydiorganosiloxanes. The first of these polymers contains from 0.02 to 0.2 mole percent of vinyl-substituted siloxane units and an average of at least 3000 siloxane units per molecule, which is equivalent to a polydimethylsiloxane having a viscosity of at least 1000 Pa.s. The vinyl radicals of this polymer can be located on either terminal or non-terminal repeating units. In all of the exemplified compositions the aforementioned first polymer contains non-terminal vinyl radicals. The second polymer contains an average of at least 100 siloxane units per molecule and at least 2 mole percent of non-terminal vinyl-substituted siloxane units. In the exemplified compositions the first polydiorganosiloxane contains an average of from 6,000 to 10,000 repeating units and from 0.1 to 0.15 mole percent of methylvinylsiloxane units per molecule, and the second polydiorganosiloxane contains from 200 to 8000 repeating units per molecule and from 1 to 50 mole percent of methylvinylsiloxane units. The maximum tear strength value reported for a cured elastomer is 59.4 kN/m. and the tensile strength of this sample is 10094 kPa.

U.S. Pat. No. 4,057,596, which issued to Takamizawa et al. on Nov. 8, 1977 discloses anti-sticking coating compositions containing two vinyl-substituted polydiorganosiloxanes, one of which contains vinyl only at the terminal positions and exhibits a viscosity of from 30 to 5,000 centistokes. The second polydiorganosiloxane contains at least 3 vinyl radicals per molecule that can be at terminal or non-terminal positions and exhibits a viscosity of from 10 centistokes. There is nothing in this patent suggesting addition of filler to obtain compositions useful for preparing elastomeric materials other than films.

U.S. Pat. No. 4,539,357, which issued to Bobear on Sep. 3, 1985 discloses peroxide cured organosiloxane compositions containing two different-type vinyl-substituted polymers exhibiting viscosities of from 1000 to 200,000 Pa.s. One of these polymers contains from 0.005 to 0.1 mole percent of vinyl-substituted siloxane units and the second contains from 0.5 to 15 mole percent of these units, with the proviso that the relative concentration of the second polymer decreases as its vinyl content increases. The vinyl-containing siloxane units of both polymers can be located at terminal or non-terminal positions within the molecule. Cured elastomers prepared using these compositions exhibit tear strengths in excess of 22 kN/m. The highest tear strength value reported in the examples is 66 kN/m. The tensile strength of this sample is 7341 kPa. The compositions described in the Bobear patent have the consistency of a gum, are not readily processable in conventional injection molding equipment and cannot be transported by pumping using conventional equipment.

U.S. Pat. No. 3,884,866, which issued to Jeram and Striker on May 20, 1975 discloses curable organosiloxane compositions containing (A) 100 parts of a high viscosity component containing at least one vinyl-terminated polydiorganosiloxane having a viscosity of from 5,000 to 1,000,000 centipoise (5 to 1,000 Pa.s) at 25 degrees C., and (B) from 5 to 40 parts of a low viscosity component containing at least one polydiorganosiloxane having a viscosity of from 50 to 5,000 centipoise (0.05 to 5 Pa.s) at 25 degrees C. The curable compositions also contain an organohydrogensiloxane and a platinum hydrosilation catalyst. The structural formulae for ingredients (A) and (B) indicate that the non-terminal repeating units of both the high and low viscosity polymers can contain vinyl radicals, however none of the exemplified compositions contain vinyl radicals bonded to non-terminal repeating units. The highest tear strength value reported for the cured elastomers prepared using these exemplified compositions is 250 pounds per inch (43.8 kN/m) and the highest tensile strength value is 1100 psi (7590 kPa.). The increase in tear strength and tensile strength is achieved at the cost of the hardness of the cured elastomer, as measured on the Shore A durometer scale. The reported durometer value for this sample is 45.

U.S. Pat. No. 4,162,243, which issued to Lee et al. on Jul. 24, 1979 discloses organosiloxane compositions that cure by the same mechanism disclosed in the Jeram and Striker patent. Because of differences in the molecular weight distribution of the vinyl-containing polydiorganosiloxane described by Lee et al. and the vinyl-containing polydiorganosiloxanes of Jeram and Striker, cured elastomers prepared using the compositions of Lee et al. exhibit higher durometer hardness values using less silica filler, with a resultant decrease in the viscosity of the curable composition.

U.S. Pat. No. 2,803,619, which issued on Aug. 20, 1957 to Dickmann, teaches improving the compression set of siloxane elastomers by combining a nonalkenyl containing polydiorganosiloxane with a vinyl-containing polysiloxane containing at least 12 silicon atoms per molecule. The resultant mixture contains one vinyl radical for each 20 to 5,000 silicon atoms and is cured using an organic peroxide. The cured compositions exemplified in this patent exhibit improved compression set values relative to a control prepared without any vinyl-containing polymer, however this improvement is achieved at the expense of maximum elongation, i.e., elongation at break which decreases from 310 percent for the control to a maximum of 260 percent for a sample containing 10% by weight of vinyl-containing polyorganosiloxane.

In U.S. Pat. No. 2,819,236, which issued on Jan. 7, 1958, Dickmann discloses the preparation of polyorganosiloxane elastomers having durometer values of less than 30 by curing a mixture containing 100 parts by weight of a polydiorganosiloxane and from 10 to 35 parts of a fluid containing phenylmethylsiloxane and either alkylvinylsiloxane or phenylvinylsiloxane units. Specified amounts of dimethylsiloxane and dimethylalkyl- or dimethylvinylsiloxane units are also present in the fluid, which exhibits a viscosity of less than 1 m²/sec at 25° C. The compositions are cured using an organic peroxide. As in the case of U.S. Pat. No. 2,803,619 the desired property, in this instance a low durometer value, is achieved at the expense of maximum elongation. The one reported maximum elongation value for a post cured composition is 580%. This sample was post cured for 24 hours at a temperature of 250° C.

U.S. Pat. No. 3,652,475, which issued to T. Wada and K. Stoh on Mar. 28, 1972, discloses peroxide-curable polyorganosiloxane compositions containing (a) 100 parts by weight of a polydiorganosiloxane having an average degree of polymerization of at least 3,000 and containing either no vinyl-containing siloxane units or from 0.02 to 0.3 mole percent of vinyl-containing siloxane units, (b) from 1 to 10 parts by weight of a polydiorganosiloxane having an average degree of polymerization of at least 3,000 and containing from 5 to 20 mole percent of vinyl-containing siloxane units and (c) from 0.5 to 5 parts by weight of a polydiorganosiloxane having an average degree of polymerization of from 10 to 1,000 and containing from 5 to 90 mole percent of vinyl-containing siloxane units. The alleged benefits of higher tear strength, resiliency and lower compression set are obtained at the expense of maximum elongation, which is 580% and 530% for the two samples that are post cured for 24 hours at 250° C. Post-curing under these conditions is required for elastomers that are expected to retain their tensile and recovery properties and dimensions during exposure to temperatures above about 150° C. The polymers of the '457 patent however, contain differing amounts of vinyl, are present in different ratios, and are cured differently than those of the present invention.

An objective of this invention is to provide tri-modal, platinum-cured polyorganosiloxane elastomer compositions that have superior dimensional stability and resiliency. These properties are particularly desirable for elastomer articles that are subjected to stresses such as repeated flexing, tension, and compression during use. Examples include medical applications such as pump tubing used for cardiopulmonary bypass, infusion and drugfill, and other medical applications such as central venous catheters and pacing leads. It has now been discovered that the aforementioned objective can be achieved using the curable elastomer compositions of this invention.

SUMMARY OF THE INVENTION

The present invention is a heat curable polyorganosiloxane composition comprising (A) a first polydiorganosiloxane having two diorganoalkenylsiloxy terminal groups per molecule and a total concentration of unsaturated hydrocarbon radicals of 0.118 to 0.156 mole percent; (B) a second polydiorganosiloxane having two diorganoalkenylsiloxy terminal groups per molecule, and no detectable concentration of pendant unsaturated hydrocarbon radicals; (C) a third polydiorganosiloxane having two diorganoalkenylsiloxy terminal groups per molecule and a total concentration of unsaturated hydrocarbon radicals of 1.37 to 2.24 mole percent; wherein the weight ratio of polydiorganosiloxanes (A), (B), and (C) satisfy the relationship (C)/(A+B)=0.0379 to 0.1071 and A/B=1.460 to 2.115; (D) a crosslinker containing silicone-hydrogen bonds, wherein the ratio of silicone-hydrogen bonds to the total ethylenically unsaturated hydrocarbon radicals present on the polydiorganosilanes (A), (B), and (C) is from 1.00 to 2.25; (E) from 5 to 50 weight percent of a silica filler; and (F) a catalytically effective amount of a platinum catalyst. Optionally, the composition may include an inhibitor.

DETAILED DESCRIPTION OF THE INVENTION

1. The Alkenyl-Substituted Polydiorganosiloxanes (Ingredients A, B and C)

The inventive feature considered responsible for the unique combination of physical properties, particularly the high dimensional stability and high resiliency exhibited by elastomers prepared from the present curable composition is the presence of three specific types of miscible diorganoalkenylsiloxy-terminated polydiorganosiloxanes in a specified range of relative concentrations.

The first diorganoalkenylsiloxy-terminated polydiorganosiloxanes, referred to hereinafter as ingredient A, contains both terminal and non-terminal (i.e. pendant radicals) alkenyl radicals and has a total alkenyl content of from 0.118 to 0.156 mole percent of the total siloxane units on the polymer. The second polydiorganosiloxane, referred to hereinafter as ingredient B, exhibits a plasticity of 1.40 to 1.65 mm, and contains vinyl or other unsaturated hydrocarbon radicals only at the terminal positions of the molecule. The third diorganoalkenylsiloxy-terminated polydiorganosiloxane, referred to hereinafter as ingredient C, contains both terminal and non-terminal alkenyl radicals (i.e., pendant radicals) and has an alkenyl content of from 1.370 to 2.240 mole percent of the total siloxane units on the polymer. The polydiorganosiloxanes (A), (B), or (C), can individually be fluids having a viscosity of as low as 0.5 Pa.s but will preferably be gums having viscosities of at least 500 Pa.s.

The weight ratio of polydiorganosiloxanes (A), (B), and (C) satisfy the relationship (C)/(A+B)=0.0379 to 0.1071 and A/B=1.460 to 2.115. The relative amounts of polydiorganosiloxanes (A), (B), and (C) must satisfy the relationship above, and are critical to achieve the desired properties of the invention. The total amounts of ingredients A, B, C, and D will comprise between 50 to 95 weight percent of the total composition. Experimental data for these preferred elastomers demonstrates that the resiliency as measured by hysteresis loss is less than 45%.

The unsaturated hydrocarbon radicals present in ingredients A, B and C are preferably alkenyl radicals which contain from 2 to about 10 carbon atoms. Preferred alkenyl radicals are terminally unsaturated, and include but are not limited to vinyl, allyl and 5-hexenyl.

The silicon-bonded organic groups present in ingredients A, B and C, in addition to alkenyl radicals, are the monovalent hydrocarbon or substituted hydrocarbon radicals described in detail in the following portions of this specification.

The term "no detectable concentration of pendant unsaturated hydrocarbon radicals," as used herein, means that the only unsaturated hydrocarbon radicals present on the non-terminal silicon atoms of this ingredient result from impurities present in the reactants used to prepare this ingredient or from undesired rearrangements occurring during preparation of this ingredient.

Ingredients A and C are diorganoalkenylsiloxy-terminated polydiorganosiloxanes that can be represented by the average general formula

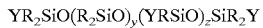

where Y represents an alkenyl radical containing from 2 to 10 carbon atoms, R is independently a monovalent hydrocarbon radical or substituted monovalent hydrocarbon radicals containing from 1 to 20 carbon atoms, and R is substantially free of ethylenic unsaturation.

The degree of polymerization for ingredients A and B is represented by the sum of v and z and is greater than or equal to about 1600.

The R radicals can be identical or different, and it is preferred that ingredient A is an extrudable liquid at 25° C., at least one of the R radicals on each of the non-terminal silicon atoms is lower alkyl, most preferably methyl. The remaining R radical can be alkyl such as methyl or ethyl; substituted alkyl such as chloromethyl, 3-chloropropyl or 3,3,3-trifluoropropyl; cycloalkyl such as cyclohexyl; or aryl such as phenyl. Any R radicals other than methyl are preferably phenyl or 3,3,3-trifluoropropyl, this preference being based on the availability of the intermediates used to prepare these polydiorganosiloxanes and the properties of cured elastomers prepared by curing compositions containing these polymers.

The radicals defined by Y are alkenyl radicals and have from 2 to 10 carbon atoms, and include but are not limited to vinyl, allyl and 5-hexenyl.

Ingredient B is a diorganoalkenylsiloxy-terminated polydiorganosiloxane, and can be represented by the average general formula

$$YR_2SiO(R_2SiO)_xSiR_2Y$$

In this formula Y represents an alkenyl radical as defined above and R is defined as above. X represents the degree of polymerization and is equal to or greater than about 1600. Because ingredients A, B and C should be miscible with one another, the silicon bonded hydrocarbon radicals present in these ingredients are preferably selected from the same class. Thus, the R groups are preferably the same group, i.e., lower alkyl such as methyl. Ingredient B has no pendant ethylenically unsaturated hydrocarbon radicals. In preferred embodiments the plasticity of ingredient B is from 1.40 to 1.65 mm.

Preferred polymers of ingredient B include but are not limited to dimethylvinylsiloxy-terminated polydimethylsiloxanes, dimethylvinylsiloxy-terminated polymethyl-3,3,3-trifluoropropylsiloxanes, dimethylvinylsiloxy-terminated-dimethylsiloxane/3,3,3-trifluoropropylmethylsiloxane copolymers and dimethylvinylsiloxy-terminated-dimethylsiloxane/methylphenylsiloxane copolymers.

Preferred polymers of ingredient A encompass all of the preferred polydiorganosiloxanes for ingredient B with the addition of 0.118 to 0.156 mole percent of non-terminal organoalkenylsiloxane units, where the preferred organic group are alkyl containing from 1 to 4 carbon atoms, fluoroalkyl such as 3,3,3-trifluoropropyl, and aryl such as phenyl.

Preferred polymers of ingredient C encompass all of the preferred polydiorganosiloxanes for ingredient B with the addition of 1.370 to 2.240 mole percent of non-terminal organoalkenylsiloxane units, where the preferred organic group are alkyl containing from 1 to 4 carbon atoms, fluoroalkyl such as 3,3,3-trifluoropropyl, and aryl such as phenyl.

Methods for preparing the liquid polydiorganosiloxanes used as ingredients A, B and C of the present compositions by hydrolysis and condensation of the corresponding halosilanes or cyclic polydiorganosiloxanes are sufficiently disclosed in the patent and other literature that a detailed description in this specification is not necessary.

2. The Organohydrogensiloxane Crosslinker (Ingredient D)

The organosiloxane compositions of this invention are cured by a platinum-catalyzed hydrosilation reaction using an organohydrogensiloxane containing an average of more than two silicon bonded hydrogen atoms per molecule. (Ingredient D). The organohydrogensiloxane contains from as few as four silicon atoms per molecule up to an average of 20 or more, and can have a viscosity of up to 10 Pa.s or higher at 25° C. The repeating units of this ingredient include but are not limited to $HSiO_{1.5}$, RHSiO and/or $R_2HSiO_{0.5}$ in addition to one or more of monoorganosiloxy, diorganosiloxane, triorganosiloxy and $SiO_{4/2}$ units. In these formulae R represents a monovalent hydrocarbon or halocarbon radical as defined above.

One preferred type of crosslinker is tris-(hydridodimethylsiloxy)propyl silane. A second class of organohydrogensiloxanes contains repeating units represented by the formula $R_3SiO_{1/2}$, RHSiO, and $SiO_{4/2}$. The concentration of RHSiO units is equivalent to a concentration of silicon-bonded hydrogen atoms in the copolymer of from 0.02 to 1.65 weight percent.

A third preferred class of organohydrogensiloxanes are copolymers consisting essentially of the repeating units $R_3SiO_{1/2}$, $R_2SiO$, RHSiO, and $RSiO_{3/2}$ units. The concentration of RHSiO units is equivalent to a concentration of silicon-bonded hydrogen atoms in the copolymer of from 0.45 to 1.67 weight percent. Copolymers of this type can be prepared by a controlled hydrolysis of a mixture comprising the corresponding organosilicon halides, such as the chlorides, or the corresponding alkoxides. These and other methods for preparing the preferred organohydrogensiloxanes of this invention are sufficiently well known that a detailed description is not required in this specification.

Proper curing of the present compositions requires that ingredients A, B, C and D be miscible with one another. To ensure sufficient miscibility the silicon bonded hydrocarbon radicals that are present in the highest concentration in these ingredients should be selected from the same class. e.g. alkyl radicals. These hydrocarbon radicals are preferably identical. In particularly preferred compositions, these hydrocarbon radicals are methyl or combinations of methyl with either 3,3,3-trifluoropropyl or phenyl.

The molar ratio of silicon bonded hydrogen atoms to vinyl or other ethylenically unsaturated hydrocarbon radicals in compositions curable by a hydrosilation reaction is critical with respect to the properties of the cured elastomer. The optimum ratio for the present curable compositions will be determined at least in part by the molecular weights of ingredients A. B, and C, the type of curing agent and the concentration of any resinous organosiloxane copolymer described hereinafter. For preferred compositions of this invention this ratio is preferably from 1.0 to 2.25.

The optimum range of this ratio for other curable compositions of this invention can readily be determined by those skilled in the art with a minimum of experimentation.

For particularly preferred compositions of this invention the molar ratio of silicon bonded hydrogen atoms to vinyl or other ethylenically unsaturated hydrocarbon radicals is between 1.4 to 2.25.

3. The Silica Filler (Ingredient E)

To achieve the properties that characterize cured elastomers prepared using the compositions of this invention, the compositions must contain from 5 to 50 weight percent of a silica filler. This type of silica filler may, but need not be, treated with one or more of the known silica treating agents to prevent a phenomenon referred to as "creping" or "crepe hardening" during processing of the curable composition.

Any finely divided form of silica can be used as a reinforcing filler. Amorphous silicas are preferred because of their relatively high surface area, which is typically at least 50 square meters per gram. Fillers having surface areas of at least 150 square meters per gram are preferred for use in the present method. Amorphous silicas can be prepared by precipitation or a fume process. Both of these preferred types of silica are commercially available.

The amount of finely divided silica used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

Silica treating agents are typically low molecular weight organosilicon compounds containing silicon-bonded hydroxyl groups or groups that can be hydrolyzed to hydroxyl groups in the presence of water. Typical hydrolyzable groups include halogen atoms such as chlorine or amino groups and other groups such as alkoxy groups containing a silicon-bonded nitrogen atom. For example, a preferred silica is obtained from a hydrophobic reinforcing silica made from the alkaline hydrolysis of $Si(OCH_3)_4$, in the presence of at least 70% of one-half of the stoichiometric amount of water required to completely hydrolyze the theoretical amount of $-OCH_3$ radicals present in the $Si(OCH_3)_4$, at least one alcohol selected from the group consisting of methanol, ethanol, n-propanol and isopropanol, at least one basic catalyst, and at least one organosilicon hydrophobing compound selected from the croup consisting of $[(CH_3)_3Si]_2NH$, $[(CH_3)_2(CF_3CH_2CH_2)Si]_2NH$, $[(CH_3OR''')SiO]_e$, $CH_3O[(CH_3)R'''SiO]_dR''''$ and $(CH_3)R'''Si(OR'')_2$ where $R'''$ is a methyl radical, a 3,3,3-trifluoropropyl radical or a vinyl radical, each $R''''$ is hydrogen or a methyl radical, the average value of d is from 1 to 12, inclusive, and the average value of e is from 3 to 6, inclusive, said hydrophobing material being added prior to gellation of the compound formed upon hydrolysis of the $Si(OCH_3)_4$.

Preferably at least a portion of the silicon bonded hydrocarbon radicals present on the treating agent are alkenyl radicals and the remainder are identical to a majority of the hydrocarbon radicals present in polydiorganosiloxanes A, B, and C.

4. The Platinum Hydrosilation Catalyst and Optional Inhibitor (Ingredient F)

Hydrosilation reactions are typically conducted in the presence of a catalyst that is a metal from the platinum group of the periodic table or a compound of such a metal. Platinum, rhodium and compounds of these metals have been shown to effectively catalyze hydrosilation reactions.

Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968.

Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70° C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned vinyl-containing reactants, curing agents and platinum-containing catalysts may begin to cure at ambient temperature. To obtain a longer working time or "pot life", the activity of the catalyst under ambient conditions can be retarded or suppressed by addition of a suitable inhibitor. Varying the amount of inhibitor can alter the curing time of the elastomer from periods of several minutes or hours up to periods of weeks or months.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalysts typically require heating at temperatures of 70° C. or above to cure at a practical rate.

If it is desired to increase the pot life of a curable composition under ambient conditions, this can be accomplished using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

5. Optional Ingredients

In addition to the vinyl-containing polydiorganosiloxanes, curing agent, catalyst and silica filler the organosiloxane compositions of this invention can contain one or more additives that are conventionally present in curable compositions of this type. These materials are added to impart or enhance certain properties of the cured elastomer or facilitate processing of the curable composition. A small amount of water can be added together with the silica treating agent(s) as a processing aid.

Typical additives include but are not limited to pigments, dyes, adhesion promoters, flame retardants, heat and/or ultraviolet light stabilizers and resinous organosiloxane copolymers to enhance the physical properties of the cured elastomer.

Diatomaceous earth and calcium hydroxide are two preferred additives based on their ability to reduce the degradation in physical properties, particularly tensile strength and modulus, and the increase in compression set value that occur when the cured elastomer comes into contact with oil heated to 150° C. or higher. The presence of calcium hydroxide also further reduces the compression set value of the cured elastomer.

6. Preparation of Curable Compositions

The silica filler can be treated in the presence of at least a portion of the other ingredients of the present compositions by blending these ingredients together until the filler is completely treated and uniformly dispersed throughout the composition to form a homogeneous material. The ingredients that are present during treatment of the silica typically include the silica treating agents and at least a portion of the polydiorganosiloxanes referred to herein as ingredients A, B and C. The organohydrogensiloxane crosslinker and platinum-containing catalyst are typically added after treatment of the silica has been completed. If calcium hydroxide is one of the ingredients, it is also added at this time.

Irrespective of the type of mixer used, blending of the silica, filler treating agent(s) and ingredients A, B and C is continued while the composition is heated at temperatures from about 100 to 250 degrees C. under reduced pressure to remove volatile materials. The resultant product is then cooled prior to being blended with the organohydrogensiloxane (Ingredient D) and/or the platinum catalyst (Ingredient E), depending upon whether it is desired to prepare a one-part or two-part curable composition of this invention. The optional additives referred to hereinbefore can be added at this time or during blending of the silica with ingredients A, B, and C.

In-situ treatment of the silica can require anywhere from 15 minutes to 2 hours, depending upon the amount of material being processed, the viscosity of the material and the shear rate to which the material is subjected during processing.

Alternatively, treatment of the silica can occur before the silica is blended with other ingredients of the present compositions. Methods for treating finely divided silica fillers prior to incorporating the silica into a polyorganosiloxane composition are known in the art.

To ensure adequate blending of all ingredients the mixing equipment in which the present compositions are prepared should be capable of subjecting the composition to a high rate of shear. The advantage of using this type of a "high intensity" mixer to prepare silica filled polyorganosiloxane compositions is taught in U.S. Pat. No. 3,690,804, which issued to Minuto on Jun. 1, 1976. In accordance with the disclosure of this patent, the tip of the stirring device in the mixer is rotated at a speed of from 7.5 to about 75 meters per second, which would generate considerable shearing forces. The exemplified compositions are blended in a Henschel high intensity mixer wherein the rotor was operated at a speed of 3800 revolutions per minute, equivalent to a rotor tip speed of 48 meters per second.

Curable compositions prepared using the present method typically exhibit viscosities of about 0.5 up to about 10,000 Pa.s at 25 degrees C. Preferred compositions are extrudable. To facilitate blending and transfer of the compositions and minimize entrapment of air during mixing a viscosity of less than about 10 Pa.s at 25 degrees C. is preferred, particularly for extrudable compositions.

Because mixtures of ingredients A, B and C with the crosslinker (ingredient D) and the platinum-containing catalyst may begin to cure under the conditions encountered during storage of these composition even in the presence of a catalyst inhibitor, to ensure long term storage stability it is desirable to separate the curing agent and the catalyst until it is desired to cure the composition. This can be achieved by packaging the curing agent and curing catalyst in separate containers to form a multi-part system. The multi-part system will include all the ingredients of the invention, but individual ingredients may be separated into one or more separate containers. The contents of the containers are then mixed to achieve the elastomer of this invention. A typical two part system would include ingredients A, B, C, D and E in one part and A, B, C, E, and F in another. When parts one and two are mixed, the curing agent and the catalyst in combination allow the elastomer to cure. In another system, the curing catalyst is encapsulated in a thermoplastic organic or silicone resin that melts or softens at the temperature to which the composition is intended to be heated during the curing process.

One part compositions curable by a platinum-catalyzed hydrosilation reaction and containing as the hydrosilation catalyst a liquid platinum compound that is microencapsulated within a thermoplastic organic polymer together with methods for preparing the microencapsulated catalyst are described in U.S. Pat. No. 4,766,176, which issued to Lee et al. on Aug. 23, 1988. The pertinent sections of this patent are incorporated into this specification by reference thereto.

7. Fabrication and Curing of Shaped Articles

The present curable compositions can be formed into shaped articles by press molding, injection molding, extrusion, or any of the other methods used to fabricate organosiloxane compositions.

In the absence of one of the aforementioned catalyst inhibitors or an encapsulated catalyst, the compositions will cure at ambient temperature over a period of several hours or days, or within several minutes when heated at temperatures of up to 250 degrees C. Compositions containing one of these catalyst inhibitors are typically cured by heating them for several minutes at temperatures of from 50 to about 250 degrees C. A preferred range is from 100 to 200 degrees C. It should be apparent that compositions containing a microencapsulated catalyst must be heated to at least the melting or softening point of the encapsulating polymer to liberate the catalyst.

Cured elastomeric articles prepared using the curable compositions of this invention exhibit tear strengths above about 125 pounds per inch (38 kN/m) and low values of compression set, are typically below 25%, without adversely affecting other desirable properties of the cured elastomer or the extrudability of the composition from which it is formed. This unique combination of properties make the elastomers desirable for a number of end use applications, including pump tubing used for cardiopulmonary bypass, infusion and drugfill, and other medical applications such as central venous catheters and pacing leads, as well as gaskets and fabricated articles wherein at least a portion of the article is relatively thin and subjected to large amounts of stress.

The following examples describe preferred curable compositions of this invention and the desirable properties of elastomers, particularly low values of compression set and high tear strength prepared by curing these compositions. The example is intended to illustrate the present invention and should not be interpreted as limiting the invention as defined in the accompanying claims. Unless indicated to the contrary all parts and percentages are by weight and all viscosities were measured at 25° C.

EXAMPLE 1

In the following examples, polydiorganosiloxane (A) was a diorganoalkenylsiloxy-terminated polydiorganosiloxane containing both terminal and non-terminal (i.e., pendant radicals) vinyl radicals having a total vinyl content of from 0.124 to 0.225 mole percent of the polymer and a plasticity of 1.40 to 1.65 mm. Polydiorganosiloxane (B) was a polydimethylsiloxane having a plasticity of 1.40 to 1.65 mm and containing vinyl only at the terminal positions of the molecule. Polydiorganosiloxane (C) was a dimethylvinylsiloxy-terminated polydiorganosiloxane containing both terminal and non-terminal (i.e., pendant radicals) vinyl radicals having an vinyl content of from 1.430 to 2.290 mole percent of the polymer and having a plasticity of 1.27 to 1.78 mm. The "mole percent of vinyl groups" on the polymers and "plasticity" of the polymers used are expressed in ranges, which is a typical method of characterizing specifications for similar commercially available materials.

Base:

The base was made in a one gallon sigma-blade mixer (Baker Perkins, Bay City, Mich.) used to impart high shear into the formulation. The polydiorganosiloxanes A, B & C were added to the mixer in the appropriate proportions and slowly blended together 5 minuites along with 0.25 weight percent of a silanol ended polydimethyl methylvinyl siloxane having a hydroxyl content of 7 weight percent and a vinyl content of 10.3 weight percent, and a silanol ended polydimethylsiloxane having a hydroxyl content of 3.8 weight percent. Then 24.5 weight percent of a fumed silica filler was added in increments at a slow enough rate to allow the polysiloxanes to wet the surface of the filler. After all the filler is added, the mass was heated to 170° C. with mixing at 60 rpm for a period of 90 minutes under a reduced pressure of 345 g/cm$^2$ to remove any volatile components.

Elastomer:

After cooling to 100° C. the base was split and formulated into two parts: Part A which contains the chloroplatinic acid catalyst at a level of 5 ppm platinum and Part B containing either Crosslinker 1 or Crosslinker 2, and the inhibitor 1-ethynlcyclohexanol at a level of 200 ppm. In the following examples, Crosslinker 1 was tris(hydridodimethylsiloxy) propyl silane and Crosslinker 2 was an organohydrogensiloxane containing repeating units represented by the formula $(CH_3)_3 SiO_{1/2}$, $(CH_3)HSiO$, and $SiO_{4/2}$ where the concentration of $(CH_3)HSiO$ units was equivalent to a concentration of silicon-bonded hydrogen atoms in the copolymer of from 0.02 to 1.65 weight percent. The crosslinkers were added in an amount required to keep the ratio of silicon/hydrogen bonds to silicon/vinyl bonds at about 2.25. A 2-roll mill was used to incorporate the curing ingredients into the base by crossblending 12 times.

Cured Elastomer:

Equal amounts by weight of Part A and Part B were thoroughly mixed by crossblending 12 times on the 2-roll mill. Approximately a 75 mil thick slab of elastomer was then press-cured at a temperature of 240° F. for 10 minutes. The samples were then allowed to sit at room temperature for a minimum of 16 hours before testing.

Durometer, tensile/elongation, and tear Die B testing were carried out according to ASTM test methods 2240, 412, and 624, respectively. Hysteresis loss was measured using an Instron, Model 1122 equipped with Series XII software.

Physical properties determined on the samples containing Crosslinker 1 are shown in TABLE 1 compared to conventional platinum and peroxide cured elastomers. It is readily seen that % hysteresis loss is significantly reduced relative to that for the platinum control and the peroxide control. Q7-4750 Biomedical Grade ETR Elastomer is a platinum catalyzed high consistency rubber available from the Dow Corning Corporation (Midland, Mich.) and Q7-4550 ETR Elastomer available from the Dow Corning Corporation (Midland, Mich.). Neither of these comparative elastomers contained a tri-modal polymer system.

TABLE 1

Effect of Polymer Blend on Physical Properties (SiH/SiVi = 2.25)

|  | Base 1 | Base 2 | Base 3 | Base 4 | Q7-4750 Biomedical Grade ETR Elastomer (Pt) | Q7-4550 ETR Elastomer (peroxide) |
|---|---|---|---|---|---|---|
| COMPONENT |  |  |  |  |  |  |
| POLYMER A (Pts) | 87.4 | 94.5 | 85.1 | 100 |  |  |
| POLYMBR B (Pts) | 58.3 | 47.3 | 56.7 | 50.0 |  |  |
| POLYMER C (Pts) | 10.3 | 14.2 | 14.2 | 6.00 |  |  |
| Crosslinker Type | 1 | 1 | 1 | 1 |  |  |
| PROPERTY |  |  |  |  |  |  |
| Durometer-Shore A | 43 | 51 | 45 | 42 | 52 | 52 |
| Tensile (psi) | 1579 | 1521 | 1278 | 1421 | 1502 | 1459 |
| Elongation (%) | 718 | 520 | 569 | 620 | 899 | 662 |
| Tear Die B (psi) | 141 | 188 | 168 | 123 | 255 | 166 |
| Hysteresis Loss (%) | 37.44 | 43.98 | 41.15 | 38.17 | 52.90 | 44.96 |

With a more resinous crosslinker such as Crosslinker 2, good physical properties are maintained while durometer and tear values are increased. This is illustrated in TABLE 2.

TABLE 2

Effect of Polymer Blend on Physical Properties (SiH/SiVi = 2.25)

|  | Base 1 | Base 2 | Base 3 | Base 4 | Q7-4750 Biomedical Grade ETR Elastomer Control (Pt) | Q7-4550 ETR Elastomer Control (peroxide) |
|---|---|---|---|---|---|---|
| COMPONENT |  |  |  |  |  |  |
| POLYMER A (Pts) | 87.4 | 94.5 | 85.1 | 100 |  |  |
| POLYMER B (Pts) | 58.3 | 47.3 | 56.7 | 50.0 |  |  |

TABLE 2-continued

Effect of Polymer Blend on Physical Properties (SiH/SiVi = 2.25)

|  | Base 1 | Base 2 | Base 3 | Base 4 | Q7-4750 Biomedical Grade ETR Elastomer Control (Pt) | Q7-4550 ETR Elastomer Control (peroxide) |
|---|---|---|---|---|---|---|
| POLYMER C (Pts) | 10.3 | 14.2 | 14.2 | 6.00 | | |
| Crosslinker Type | 2 | 2 | 2 | 2 | | |
| PROPERTY | | | | | | |
| Durometer-Shore A | 50 | 58 | 53 | 49 | 52 | 52 |
| Tensile (psi) | 1206 | 1398 | 1096 | 1221 | 1502 | 1459 |
| Elongation (%) | 613 | 537 | 503 | 616 | 899 | 662 |
| Tear Die B (psi) | 217 | 250 | 242 | 214 | 255 | 166 |
| Hysteresis Loss (%) | 42.65 | 49.25 | 46.64 | 38.27 | 52.90 | 44.96 |

EXAMPLE 2

Using the same procedures and conditions described above in Example 1 for the lab samples, the Base 1 formulation was manufactured in a 2000 liter Baker-Perkins mixer and compounded into Parts A and B on a 2-roll mill. Equal amounts by weight of Part A and Part B were then mixed by crossblending 12 times on a 2-roll mill and then extruded through a 3.5 inch, Davis-Standard extruder into a heated oven maintained at a temperature of 204° C. The line speed for the extruder for size 16 tubing (3.17 mm ID, 6,48 mm OD) was 9.1 meters per minute, for size 17 (6.3 mm ID, 9.65 mm OD) it was 7.6 meters per minute, and for size 73 (9.52 mm ID, 16.38 mm OD) it was 4.57 meters per minute.

Testing was then done on the tubing to see if the improvement in hysteresis, in fact, is reflected in improved pump life. Easy-Load pump heads, Model No. 7518-00 and 7529-00 and Standard pump heads, Model No. 7016-20, 7017-20, and 7019-20 were used to test the time to rupture on various sizes of tubing. Results of that testing compared to conventional platinum cured tubing is shown in TABLE 3.

TABLE 3

| | Time to Rupture (hours) | | |
|---|---|---|---|
| | Tubing Size | | |
| | Size 16 | Size 17 | Size 73 |
| Standard Pump | | | |
| New Elastomer | 90.3 | 145.7 | 100.1 |
| Conventional | 32.1 | 44.3 | 29.0 |
| Easy-Load Pump | | | |
| New Elastomer | 31.6 | 39.6 | 42.7 |
| Conventional | 15.6 | 12.3 | 14.5 |

This data clearly demonstrates that the changes made in the formulation, which resulted in improved hysteresis loss, translate into significantly improved longevity in pump life performance compared to conventional platinum catalyzed tubing.

That which is claimed is:

1. A heat curable polyorganosiloxane composition comprising:
   (A) a first polydiorganosiloxane having two diorganoalkenylsiloxy terminal groups per molecule and a total concentration of unsaturated hydrocarbon radicals of 0.118 to 0.156 mole percent of the total siloxane units on the polymer;
   (B) a second polydiorganosiloxane having two diorganoalkenylsiloxy terminal groups per molecule, and no pendant unsaturated hydrocarbon radicals and a plasticity of 1.40 to 1.65 mm;
   (C) a third polydiorganosiloxane having two diorganoalkenylsiloxy terminal groups per molecule and a total concentration of unsaturated hydrocarbon radicals of 1.370 to 2.240 mole percent of the total siloxane units on the polymer;
   wherein the weight ratio of polydiorganosiloxanes (A), (B), and (C) is (C)/(A+B)=0.0379 to 0.1071 and A/B= 1.460 to 2.115;
   (D) a crosslinker containing silicon-hydrogen bonds, wherein the ratio of silicon-hydrogen bonds to unsaturated hydrocarbon radicals present on the total of polydiorganosilanes (A), (B), and (C) is from 1.00 to 2.25;
   (E) from 5 to 50 weight percent of a silica filler; and
   (F) a catalytically effective amount of a platinum catalyst.

2. A heat curable composition according to claim 1 where polydiorganosiloxane B consists essentially of repeating units and said terminal groups, and where said repeating units are represented by the formula $R_2SiO$ where each R is a monovalent radical containing from 1 to 8 carbon atoms and is individually selected from the group consisting of alkyl, haloalkyl, cycloalkyl, phenyl, alkylphenyl and phenylalkyl.

3. A heat curable composition according to claim 2 where R is methyl, phenyl or 3,3,3-trifluoropropyl.

4. A heat curable composition according to claim 1 where the terminal groups of polydiorganosiloxanes A, B and C are dimethylvinylsiloxy.

5. A heat curable composition according to claim 1 wherein polydiorganosiloxanes A and C are dimethylvinylsiloxy-terminated dimethyl, methylvinyl siloxanes, and polydiorganosiloxane B is a dimethylvinylsiloxy terminated polydimethylsiloxane.

6. A heat curable composition according to claim 1 where said silica filler comprises amorphous silica.

7. A heat curable composition according to claim 1 wherein the crosslinker is an organohydrogensiloxane containing repeating units represented by the formula $R'_3SiO_{1/2}$, R'HSiO, and $SiO_{4/2}$, where R' is an alkyl group containing 1 to 10 carbon atoms.

8. A heat curable composition according to claim 1 wherein the silica filler is a hydrophobic reinforcing silica obtained from the alkaline hydrolysis of Si(OCH$_3$)$_4$, in the presence of at least 70% of one-half of the stoichiometric amount of water required to completely hydrolyze the theoretical amount of —OCH$_3$ radicals present in the Si(OCH$_3$)$_4$, at least one alcohol selected from the group consisting of methanol, ethanol, n-propanol and isopropanol, at least one basic catalyst, and at least one organosilicon hydrophobing compound selected from the group consisting of [(CH$_3$)$_3$Si]$_2$NH, [(CH$_3$)$_2$(CF$_3$CH$_2$CH$_2$)Si]$_2$NH, [(CH$_3$OR'''SiO]$_e$, CH$_3$O[(CH$_3$)R'''SiO]$_d$R'''' and (CH$_3$)R'''Si(OR'')$_2$ where R''' is a methyl radical, a 3,3,3-trifluoropropyl radical or a vinyl radical, each R'''' is hydrogen or a methyl radical, the average value of d is from 1 to 12, inclusive, and the average value of e is from 3 to 6, inclusive, said hydrophobing material being added prior to gellation of the compound formed upon hydrolysis of the Si(OCH$_3$)$_4$.

9. A heat curable composition according to claim 1 wherein the silica filler is treated with silica treatment agents.

10. A heat curable composition according to claim 1 wherein the composition includes a platinum catalyst inhibitor.

11. The reaction product of the composition of claim 1.

12. A heat curable composition according to claim 1 wherein at least one of the polydiorganosiloxanes A, B, or C is a gum having a viscosity of greater than 500 Pa.s.

13. A method for preparing a heat curable polyorganosiloxane elastomer comprising the steps of:

(I) blending polydiorganosiloxanes (A), (B), and (C), wherein (A) has two diorganoalkenylsiloxy terminal groups per molecule and a total concentration of unsaturated hydrocarbon radicals of 0.118 to 0.156 mole percent of the total siloxane units on the polymer, polydiorganosiloxane (B) having two diorganoalkenylsiloxy terminal groups per molecule, and no pendant unsaturated hydrocarbon radicals and a plasticity of 1.40 to 1.65 mm, and polydiorganosiloxane (C) has two diorganoalkenylsiloxy terminal groups per molecule and a total concentration of unsaturated hydrocarbon radicals of 1.370 to 2.240 mole percent of the total siloxane units on the polymer, wherein the weight ratio of polydiorganosiloxane (A), (B), and (C) is (C)/(A+B)=0.0379 to 0.1071 and A/B=1.460 to 2.115;

(II) heating said blend;

(III) adding to said heated blend from 0.46 to 10 parts by weight of a crosslinker containing silicon-hydrogen bonds, wherein the ratio of silicon-hydrogen bonds to unsaturated hydrocarbon radicals present on the total of polydiorganosilanes (A), (B), and (C) is from 1.00 to 2.25;

(IV) adding from 10 to 80 parts by weight of a silica filler;

(V) adding a catalytically effective amount of a platinum catalyst and an inhibitor; and (VI) heating the resultant curable polyorganosiloxane composition to cure it to an elastomer.

14. The method of claim 13 where polydiorganosiloxane B consists essentially of repeating units and said terminal groups, and where said repeating units are represented by the formula R$_2$SiO, where each R is a monovalent radical containing from 1 to 8 carbon atoms and is individually selected from the group consisting of alkyl, haloalkyl, cycloalkyl, phenyl, alkylphenyl and phenylalkyl.

15. The method of claim 13 wherein polydiorganosiloxanes A and C are dimethylvinylsiloxy-terminated dimethyl, methylvinyl siloxanes, and polydiorganosiloxane B is a dimethylvinylsiloxy terminated polydimethylsiloxane.

16. The method of claim 13 where said silica filler comprises amorphous silica.

17. The method of claim 13 wherein the crosslinker is an organohydrogensiloxane containing repeating units represented by the formula R'$_3$SiO$_{1/2}$, R'HSiO, and SiO$_{4/2}$, where R' is an alkyl group containing 1 to 10 carbon atoms.

18. The method of claim 13 wherein the silica filler is a hydrophobic reinforcing silica obtained from the alkaline hydrolysis of Si(OCH$_3$)$_4$, in the presence of at least 70% of one-half of the stoichiometric amount of water required to completely hydrolyze the theoretical amount of —OCH$_3$ radicals present in the Si(OCH$_3$)$_4$, at least one alcohol selected from the group consisting of methanol, ethanol, n-propanol and isopropanol at least one basic catalyst, and at least one organosilicon hydrophobing compound selected from the group consisting of [(CH$_3$)$_3$Si]$_2$NH, [(CH$_3$)$_2$(CF$_3$CH$_2$CH$_2$)Si]$_2$NH, [(CH$_3$OR''')SiO]$_e$ CH$_3$O[(CH$_3$)R'''SiO]$_d$R'''' and (CH$_3$)R'''Si(OR'')$_2$ where R''' is a methyl radical, a 3,3,3-trifluoropropyl radical or a vinyl radical, each R'''' is hydrogen or a methyl radical, the average value of d is from 1 to 12, inclusive, and the average value of e is from 3 to 6, inclusive, said hydrophobing material being added prior to gellation of the compound formed upon hydrolysis of the Si(OCH$_3$)$_4$.

19. The method of claim 13 wherein the silica filler is treated in situ with silica treatment agents.

20. The method of claim 13 wherein at least one of the polydiorganosiloxanes A, B, or C is a gum having a viscosity of greater than 500 Pa.s.

21. A multi-part composition comprising:

(A) a first polydiorganosiloxane having two diorganoalkenylsiloxy terminal groups per molecule and a total concentration of unsaturated hydrocarbon radicals of 0.118 to 0.156 mole percent of the total siloxane units on the polymer;

(B) a second polydiorganosiloxane having two diorganoalkenylsiloxy terminal groups per molecule, and no pendant ethylenically unsaturated hydrocarbon radicals and a plasticity of 1.40 to 1.65 mm;

(C) a third polydiorganosiloxane having two diorganoalkenylsiloxy terminal groups per molecule and a total concentration of unsaturated hydrocarbon radicals of 1.370 to 2.240 mole percent of the total siloxane units on the polymer;

wherein the weight ratio of polydiorganosiloxanes (A), (B), and (C) is (C)/(A+B)=0.0379 to 0.1071 and A/B=1.460 to 2.115;

(D) a crosslinker containing silicone-hydrogen bonds, wherein the ratio of silicone-hydrogen bonds to ethylenically unsaturated hydrocarbon radicals present on the total of polydiorganosilanes (A), (B), and (C) is from 1.00 to 2.25;

(E) from 5 to 50 weight percent of a silica filler; and (F) a catalytically effective amount of a platinum catalyst with the proviso that ingredient (D) and ingredient (F) are in separate parts.

22. A heat curable composition according to claim 21 where polydiorganosiloxane B consists essentially of repeating units and said terminal groups, and where said repeating units are represented by the formula R$_2$SiO, where each R is a monovalent radical containing from 1 to 8 carbon atoms and is individually selected from the group consisting of alkyl, haloalkyl, cycloalkyl, phenyl, alkylphenyl and phenylalkyl.

23. A heat curable composition according to claim 21 wherein polydiorganosiloxanes A and C are dimethylvinylsiloxy-terminated dimethyl, methylvinyl siloxanes, and polydiorganosiloxane B is a dimethylvinylsiloxy terminated polydimethylsiloxane.

24. A heat curable composition according to claim 21 where said silica filler comprises amorphous silica.

25. A heat curable composition according to claim 21 wherein the crosslinker is an organohydrogensiloxane containing repeating units represented by the formula $R'_3SiO_{1/2}$, R'HSiO, and $SiO_{4/2}$, where R' is an alkyl group containing 1 to 10 carbon atoms.

26. A heat curable composition according to claim 21 wherein the silica filler is a hydrophobic reinforcing silica obtained from the alkaline hydrolysis of $Si(OCH_3)_4$, in the presence of at least 70% of one-half of the stoichiometric amount of water required to completely hydrolyze the theoretical amount of —$OCH_3$ radicals present in the $Si(OCH_3)_4$, at least one alcohol selected from the group consisting of methanol, ethanol, n-propanol and isopropanol, at least one basic catalyst, and at least one organosilicon hydrophobing compound selected from the group consisting of $[(CH_3)_3Si]_2NH$, $[(CH_3)_2(CF_3CH_2CH_2)Si]_2NH$, $[(CH_3OR''')SiO]$, $CH_3O[(CH_3)R'''SiO]_dR''''$ and $(CH_3)R'''Si(OR'''')_2$ where R''' is a methyl radical, a 3,3,3-trifluoropropyl radical or a vinyl radical, each R'''' is hydrogen or a methyl radical, the average value of d is from 1 to 12, inclusive, and the average value of e is from 3 to 6, inclusive, said hydrophobing material being added prior to gellation of the compound formed upon hydrolysis of the $Si(OCH_3)_4$.

27. A heat curable composition according to claim 21 wherein the silica filler is treated with silica treatment agents.

28. A heat curable composition according to claim 21 wherein the composition includes a platinum catalyst inhibitor.

29. A heat curable composition according to claim 21 wherein at least one of the polydiorganosiloxanes A, B, or C is a gum having a viscosity of greater than 500 Pa.s.

30. A shaped article formed from the composition of claim 1.

31. The method of claim 13 comprising the additional step of forming a shaped article from the curable polyorganosiloxane composition.

32. A shaped article made from the composition of claim 21.

* * * * *